US012661862B2

(12) United States Patent
Kurihara

(10) Patent No.: US 12,661,862 B2

(45) Date of Patent: Jun. 23, 2026

(54) METHOD FOR FORMING A BODY SECTION OF A PAPER CUP AND A PAPER SLEEVE

(71) Applicant: TOKAN KOGYO CO., LTD., Tokyo (JP)

(72) Inventor: Shinichiro Kurihara, Tokyo (JP)

(73) Assignee: TOKAN KOGYO CO., LTD., Tokyo (JP)

( * ) Notice: Subject to any disclaimer, the term of this patent is extended or adjusted under 35 U.S.C. 154(b) by 164 days.

(21) Appl. No.: 17/999,043

(22) PCT Filed: Jan. 7, 2021

(86) PCT No.: PCT/JP2021/000341

§ 371 (c)(1),
(2) Date: Nov. 16, 2022

(87) PCT Pub. No.: WO2021/234996

PCT Pub. Date: Nov. 25, 2021

(65) Prior Publication Data

US 2023/0182429 A1 Jun. 15, 2023

(30) Foreign Application Priority Data

May 19, 2020 (JP) ................................ 2020-087741

(51) Int. Cl.
*B31B 50/62* (2017.01)
*B31B 50/28* (2017.01)
(Continued)

(52) U.S. Cl.
CPC ............ *B31B 50/624* (2017.08); *B31B 50/28* (2017.08); *B31B 50/88* (2017.08); *B31B 2110/10* (2017.08); *B31C 7/02* (2013.01); *B31F 1/08* (2013.01)

(58) Field of Classification Search
CPC .... B31B 50/624; B31B 50/88; B31B 2110/10
See application file for complete search history.

(56) References Cited

U.S. PATENT DOCUMENTS

| | | | |
|---|---|---|---|
| 3,338,142 | A | 8/1967 | Simspon et al. |
| 3,463,060 | A | 8/1969 | Chebuhar |

(Continued)

FOREIGN PATENT DOCUMENTS

| | | | |
|---|---|---|---|
| CA | 1198383 | A | 12/1985 |
| CN | 101001785 | A | 7/2007 |

(Continued)

OTHER PUBLICATIONS

Japanese Patent Office, Office Action dated May 10, 2023 with English translation in Japanese Patent Application No. 2022-524875, 12 pages.

(Continued)

*Primary Examiner* — Anna K Kinsaul

(74) *Attorney, Agent, or Firm* — MASUVALLEY & PARTNERS; Peter Martinez

(57) ABSTRACT

Provided Is a technology whereby defects can be suppressed when blanks are rolled and end sections bonded, during molding of paper containers including paper cups and paper sleeves. The blank is embossed, one end of the blank is folded in towards the center of the container, a fold line L is formed, the blank is curled around to make a curved surface, one end 2 of the blank is arranged on the lower side and the other end 1 of the blank on the upper side, the one end 2 and the other end 1 of the blank are bonded, and an inverted cone or cylindrical shape is formed.

6 Claims, 11 Drawing Sheets

(A)

(B)

(51) Int. Cl.

| | |
|---|---|
| ***B31B 50/88*** | (2017.01) |
| ***B31B 110/10*** | (2017.01) |
| ***B31C 7/02*** | (2006.01) |
| ***B31F 1/08*** | (2006.01) |

(56) References Cited

U.S. PATENT DOCUMENTS

| | | | | |
|---|---|---|---|---|
| 3,908,523 | A * | 9/1975 | Shikaya | B65D 3/22 493/110 |
| 5,205,473 | A * | 4/1993 | Coffin, Sr. | B65D 3/22 220/DIG. 30 |
| 5,769,311 | A * | 6/1998 | Morita | B31F 1/007 220/62.12 |
| 6,085,970 | A | 7/2000 | Sadlier | |
| 6,257,485 | B1 * | 7/2001 | Sadlier | B65D 81/3874 229/198.2 |
| 7,552,841 | B2 * | 6/2009 | Hollis | B29C 63/06 220/703 |
| 8,960,528 | B2 * | 2/2015 | Sadlier | B65D 81/3874 229/939 |
| 2008/0087677 | A1 | 4/2008 | Robertson et al. | |
| 2008/0280743 | A1 | 11/2008 | Stahlecker et al. | |
| 2010/0154983 | A1 | 6/2010 | Messerschmid | |
| 2012/0145310 | A1 | 6/2012 | Riethmueller | |
| 2012/0264581 | A1 | 10/2012 | Babinsky et al. | |
| 2013/0200090 | A1 | 8/2013 | Dickert | |
| 2023/0182429 | A1 * | 6/2023 | Kurihara | B31B 50/88 493/54 |

FOREIGN PATENT DOCUMENTS

| | | | |
|---|---|---|---|
| JP | S58-29912 | U | 2/1983 |
| JP | 1987-011714 | U | 1/1987 |
| JP | H03075120 | U1 | 7/1991 |
| JP | H 06-061773 | U | 8/1994 |
| JP | H09550 | U1 | 12/1997 |
| JP | 2603108 | Y2 | 12/1999 |
| JP | 2000-168762 | A | 6/2000 |
| JP | 2001-063720 | A | 3/2001 |
| JP | 2007-15771 | A | 1/2007 |
| JP | 2016-060507 | A | 4/2016 |
| JP | 2016-098013 | A | 5/2016 |
| JP | 2016-155579 | A | 9/2016 |

OTHER PUBLICATIONS

WIPO, International Search Report and Written Opinion (with English translation) issued on Mar. 2, 2021 in the PCT Application No. PCT/JP2021/000341, 13 pages.

Japanese Patent Office, Office Action issued on Sep. 6, 2023 with English translation in Japanese Patent Application No. 2022-524875, 13 pages.

European Patent Office, Extended European Search Report dated Jun. 3, 2024 in European Patent Application No. 21809752.5, 7 pages.

CNIPA, Office Action dated Jun. 28, 2024 with English translation in Chinese Patent Application No. 202180035855.6, 15 pages.

* cited by examiner (A) REFERENCE EXAMPLE 1

(B) REFERENCE EXAMPLE 2

FIG. 9
CAREFULLY CRAFTED
THE
ORIGINAL
STRIKE SPIRIT

METHOD FOR FORMING A BODY SECTION OF A PAPER CUP AND A PAPER SLEEVE

RELATED APPLICATIONS

This application is the U.S. National Phase of and claims priority to International Patent Application No. PCT/JP2021/000341, International Filing Date Jan. 7, 2021, entitled Container Molding Method And Device Therefor, which claims priority to Japan Application No. 2020-087741 filed May 19, 2020; both of which are incorporated herein by reference in their entireties.

TECHNICAL FIELD

The present invention relates to a method for forming a body section of a paper cup and a method for forming a paper sleeve. The body section is part of the paper cup. The paper sleeve is used with cup. The paper cup is one type of paper container. The paper sleeve is also one type of paper container.

BACKGROUND OF ART

Examples of a body section of a paper cup and a paper sleeve are shown (e.g., see FIG. 11). FIG. 11A illustrates a paper cup, of which a body section is formed by the method. The paper cup is translucent so that the inside of the cup can be seen. FIG. 11B illustrates a composite container including a paper sleeve to be used with a cup.

The paper cup includes a circular bottom section and a body section having a reverse truncated cone shape or a cylindrical shape and being vertically arranged along a rim of the bottom section. The body section may include, as required, a flange and a lid on its upper edge.

The paper sleeve is wrapped around an outer circumference of the body section of the paper cup or the resin made container to form the composite container. When the composite container has a reverse truncated cone shape, the paper sleeve also has a reverse truncated cone shape.

In other words, the body section of the paper cup and the paper sleeve have a similar shape. The body section of the paper cup and the paper sleeve are formed in such a manner that a fan-shaped blank is rolled up, a one end part is placed underneath the other end part, i.e., the other end part is placed above the one end part, and both end parts are overlapped to each other to be bonded (e.g., heat welded) together (e.g., Patent Literature 1).

Now, a paper container, e.g., a paper cup and a paper sleeve, having an embossed surface is proposed (e.g., Patent Literature 2). The embossing improves a container shape-keeping performance and a heat insulating property. For example, in a case of a paper container containing hot coffee, a person does not easily feel the heat while the paper container is in his hand so that the person can reduce an opportunity to spill the coffee. An uneven depth made by embossing is about a range between a several hundred μm and 2 mm.

CITATION LIST

Patent Literature

[Patent Literature 1] JP 2016-098013A
[Patent Literature 2] JP-UM 2603108B

SUMMARY OF INVENTION

Technical Problem

Recently, a design property of a paper container comes to draw the attention. For example, to enhance the design property, a combination of printing and embossing is studied. As a result, an embossing pattern tends to be complicated.

Further, the embossing enhances a rigidity of paper. If a complicated embossing is provided, there occurs a difference in rigidity. This difference in rigidity makes an easy roll-up portion and a hard roll-up portion when rolling up a blank. Therefore, inconvenience may occur in forming a curved surface.

As a result, it is impossible to place a one end part of the blank underneath the other end part of the blank, i.e., the other end part of the blank is placed above the one end part of the blank. This may cause hitting between the one end part and the other end part of the blank, when bonding the blank end parts, thereby inviting possible occurrence of a bonding defect.

The present invention was made to solve the above-described problem. A purpose of the present invention is to provide a technique for minimizing the occurrence of inconveniences upon rolling up the blank and bonding the end parts of the blank together when forming a body section of a paper cup or a paper sleeve.

Solution to Problem

The present invention for achieving the above-described purpose is a method for forming a body section of a paper cup or a paper sleeve. Embossing is provided on a blank, a one end part of the blank is folded toward a center of the container, the blank is rolled up to form a curved surface, the one end part of the blank is placed underneath the other end part of the blank, and the one end part of the blank and the other end part of the blank are bonded together, thereby forming the blank into a reverse truncated cone shape or a cylindrical shape.

The formation of the folding line according to the present application makes it easy to place the upper end part above the lower end part. This can reduce a possible occurrence of bonding defect.

Preferably, the folding line is positioned away from the one end part of the blank by 30% or more with respect to a bonding width.

Accordingly, an effect produced by the formation of the folding line is assured.

Preferably, the one end part of the blank is folded at an angle of 30-90 degrees with respect to the surface of the blank.

Accordingly, an effect produced by the formation of the folding line is assured.

Preferably, the embossing randomly provided on the blank makes the rigidity of the blank nonuniform.

Such problem arising in the blank can be solved.

Preferably, the embossing provided on a center area of the blank makes the rigidity of the blank nonuniform.

Such problem arising in the blank can be solved.

Preferably, a design is preliminary printed on the blank, and the embossing is provided thereafter so as to correspond to the printed design.

Such problem arising in the blank can be solved.

The present invention for achieving the above-described purpose is directed to a device for providing embossing on a blank for forming a body section of a paper cup or a paper sleeve. The device provides embossing and includes a creaser for folding a one end part of the blank toward a center of the container.

The creaser can form a folding line.

The present invention for achieving the above-described purpose is directed to a method for forming a body section of a paper cup or a paper sleeve. A basis weight of a blank is 150-350 g/m2, a one end part of the blank is folded toward a center of the container, the blank is rolled up to form a curved surface, the one end part of the blank is placed underneath the other end part of the blank, and the one end part of the blank and the other end part of the blank are bonded together, thereby forming the blank into a reverse truncated cone shape or a cylindrical shape.

The formation of the folding line according to the present application can solve the problems arising in the blank of a high rigidity.

Advantageous Effect of Invention

According to the present invention, inconveniences occurring in rolling up the blank and in bonding the end parts of the blank can be minimized.

Further, according to the present invention, the embossing can enhance a design property.

DESCRIPTION OF EMBODIMENTS

Summary

A body section of a paper cup or a paper sleeve are formed according to the present embodiment. The present embodiment may include not only a body section of a paper cup or a paper sleeve but also a resin made container. A body section of the paper cup or the paper sleeve are formed of a fan-shaped blank.

The fan-shaped blank is punched out from a design printed pattern paper, and embossing is provided on the blank.

Figure 1:
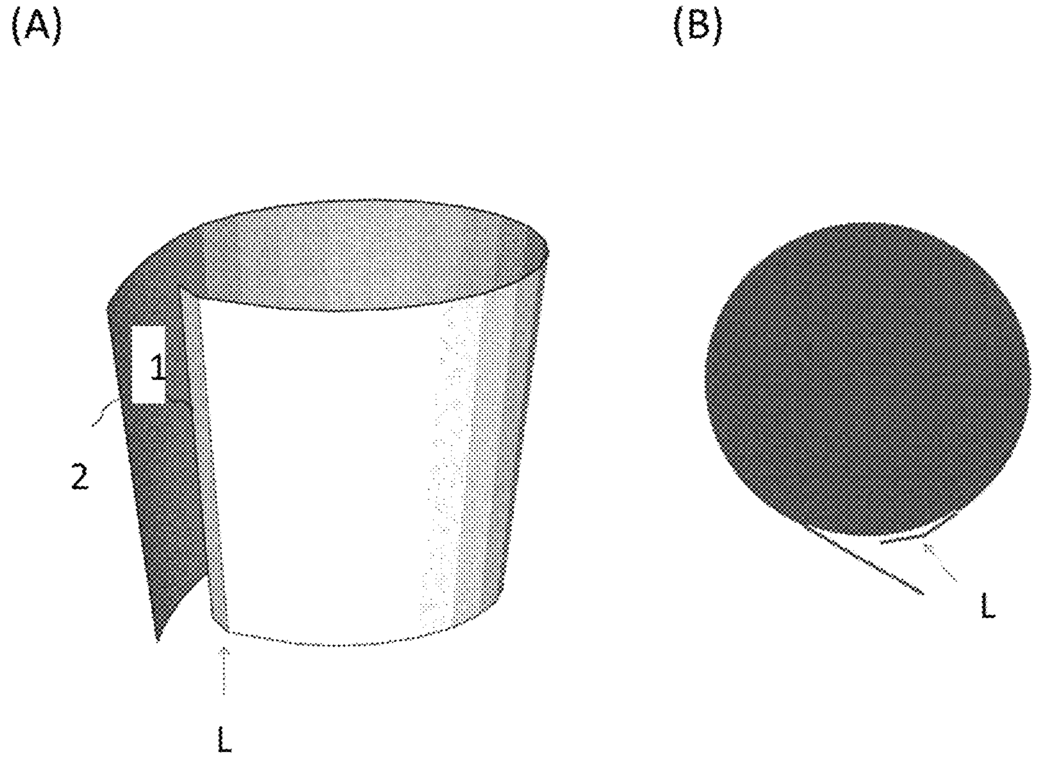
FIG. 1 is a schematic diagram illustrating a forming method according to a present embodiment.

FIG. 1 is a schematic diagram illustrating a forming method according to the present embodiment. FIG. 1A is a perspective view, and FIG. 1B is a top view. Upon embossing, a one end part 1 of the blank is folded toward a center of the container. A folding line L is formed thereby.

The blank for forming a body section of a paper cup or a paper sleeve is rolled up, the one end part 1 is placed underneath the other end part 2, i.e., the other end part 2 is placed above the one end part, to make bonding surfaces of the end parts face to each other. Then, both end parts are superimposed for bonding by a predetermined bonding width. Accordingly, the body section of the paper cup or the paper sleeve are formed.

Detailed Description of How to Form Folding Line L

Figure 2:
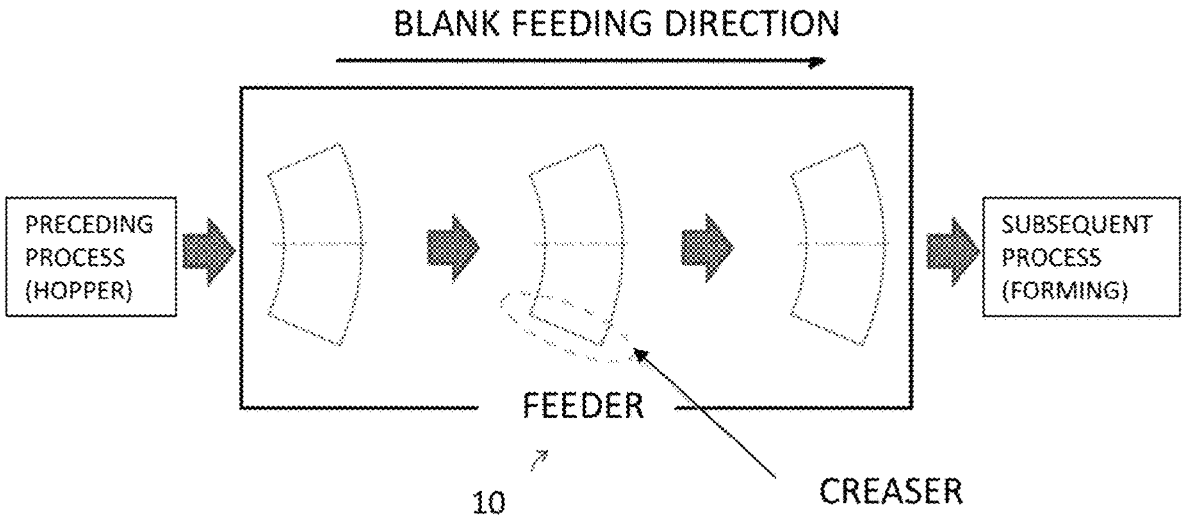
FIG. 2 is a how-to diagram illustrating a performance of a forming device.

FIG. 2 is a how-to diagram illustrating an entire flow of processes performed by a forming device. A creaser 10 (folding mechanism) is additionally installed in the generally used forming device. A portion where the creaser 10 is additionally installed is surrounded.

Figure 3:
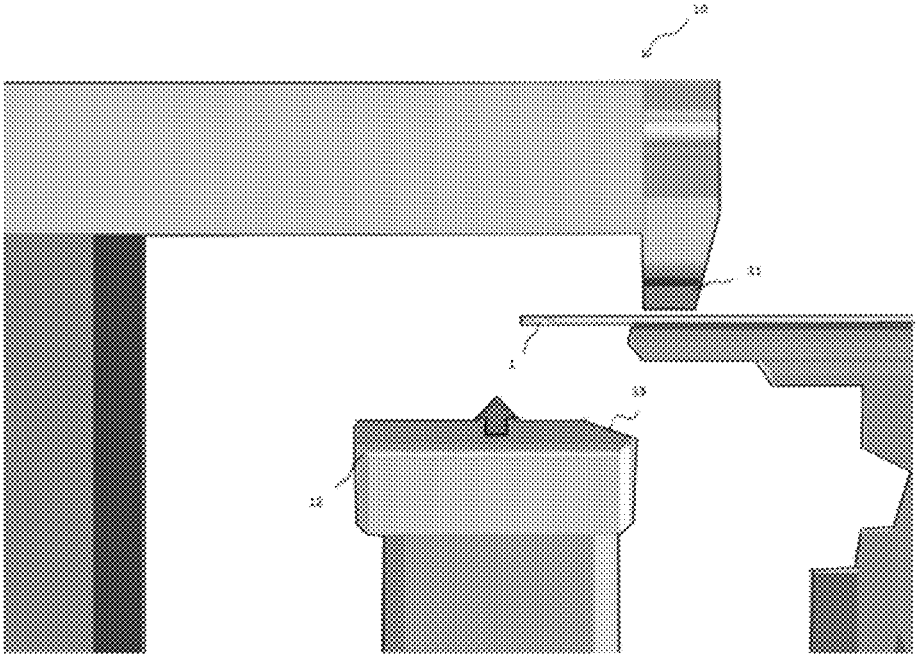
FIG. 3 is an operation view (before operation).
Figure 4:
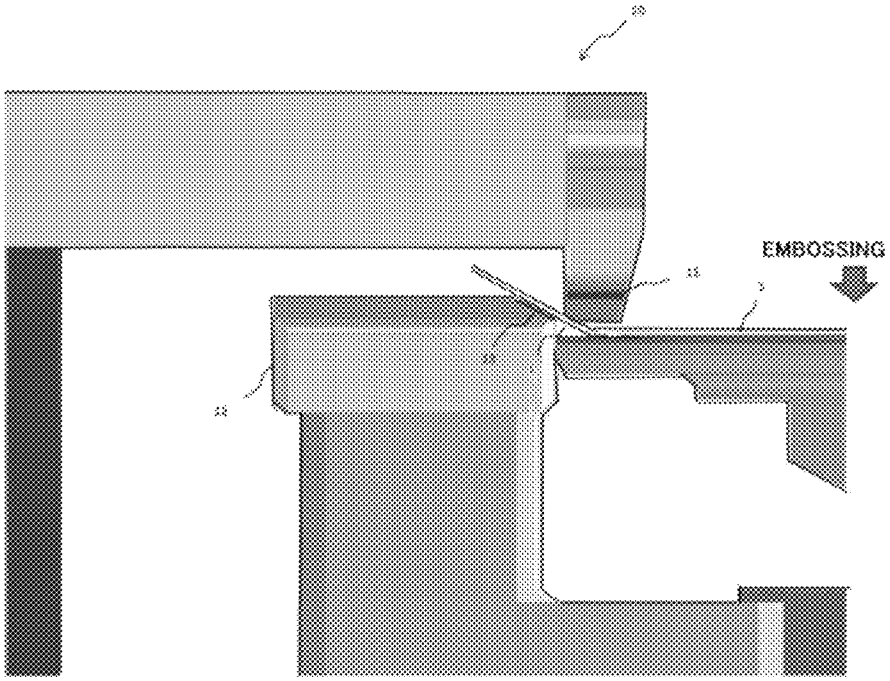
FIG. 4 is an operation view (after operation).

FIG. 3 and FIG. 4 illustrate examples of operations of the creaser 10. FIG. 3 illustrates a state before operation, and FIG. 4 illustrates a state after operation.

The blank is placed on a support table for embossing. At the time, the one end part 1 of the blank is out of the support table.

The creaser 10 includes an upper section 11 which is stable and a lower section 12 which is movable. The upper section 11 of the creaser is positioned above the blank and closer to a central side of the blank than a position where the folding line L is to be formed. As a result of this positioning, the blank is sandwiched between the support table and the upper section 11 of the creaser. The lower section 12 of the creaser is positioned beneath the blank and closer to an end part side of the blank than the position where the folding line L is to be formed. At a portion corresponding to the position where the folding line L is to be formed in the lower section 12 of the creaser, a slope 13 having an angle of 30-90 degrees (e.g., an angle of 60 degrees) is formed.

When the lower section 12 of the creaser moves upwardly, a shear force occurs between the lower section 12 and the upper section 11 of the creaser. By the shear force, the folding line L is formed on the one end part 1 of the blank.

Figure 5:
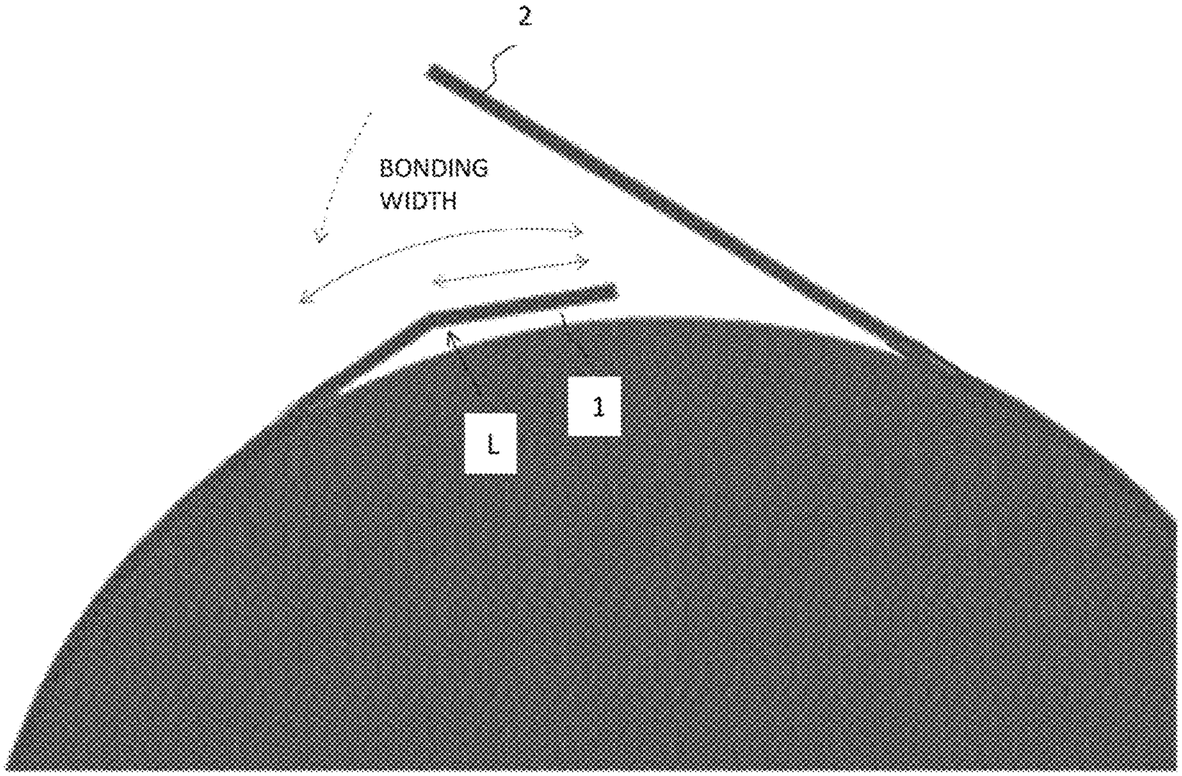
FIG. 5 is a view illustrating in detail a forming method according to the present embodiment.
Figure 6:
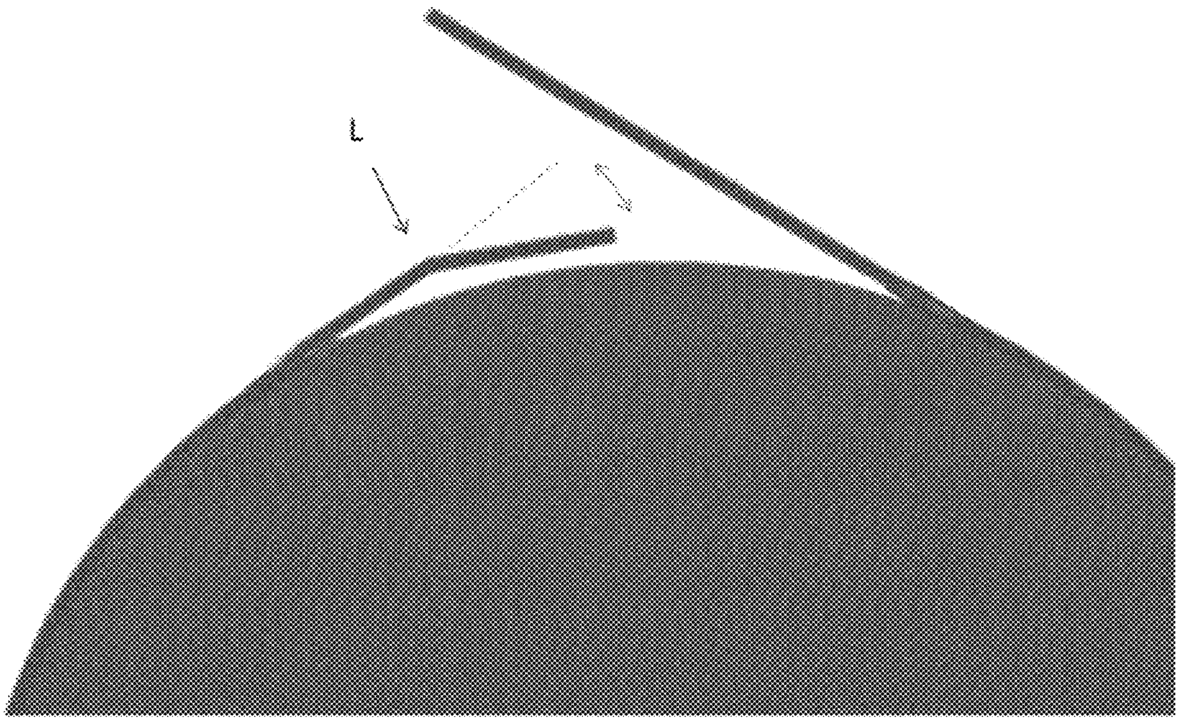
FIG. 6 is a view illustrating in detail the forming method according to the present embodiment.

FIG. 5 and FIG. 6 are views illustrating the forming method of the present embodiment in detail. A flow of forming the container is as follows. After the embossing and the folding of the one end part by the creaser, the blank is wrapped around a mandrel, as a reverse conical shaped model, having the same shape as the body section of the container. FIG. 5 and FIG. 6 are schematic diagrams illustrating the blank when it is wrapped around the mandrel.

A position for forming the folding line L is away from the one end part of the blank by 30% or more with respect to a bonding width (e.g., 3 mm with respect to a 10 mm bonding width). In a case of less than 30%, a satisfactory effect cannot be produced by the formation of the folding line L (described below). It may be set to 100% (=bonding width) or more. But 100% is the practical upper limit.

By the folding line L, the one end part 1 of the blank is given an angle of 30-90 degrees (e.g., an angle of 60 degrees) with respect to a surface of the blank. More preferably, the angle is 45 degrees or more. Also preferably, the angle is 75 degrees or less. The angle corresponds to an angle of the slope 13. Here, because of the elasticity of paper, the angle slightly returns. Therefore, the angle becomes shallower than the angle of the slope 13. In a case of less than 30 degrees, an effect produced by the formation of the folding line L (described below) becomes unsatisfactory. In a case of beyond 90 degrees, the angle may invite a cause of bonding defect.

Reference Example

Before describing about Preferred Embodiments of the present invention, Reference Examples will be described blow. It is to be understood that the forming method of the present invention is not excepted intentionally from the Reference Examples but may be applied thereto, as required.

Figure 7:
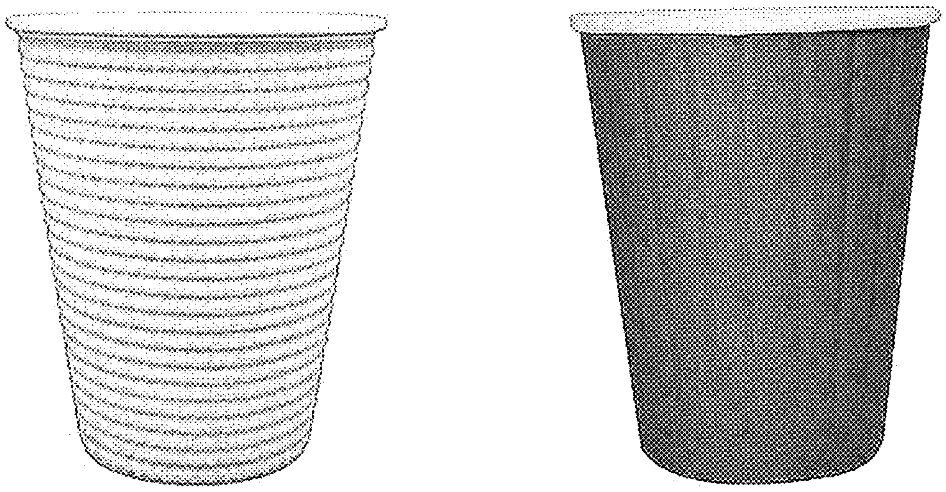
FIG. 7 illustrates paper containers according to Reference Examples.

FIG. 7 illustrates paper cups disclosed in the Reference Examples. A body section of each paper cup is provided with embossing. In the embossing illustrated in FIG. 7A, projection parts having almost rectangular shape are intermittently repeated in a circumferential direction to form a line, and a plurality of the lines is formed in an up and down direction at roughly equal intervals (Reference Example 1). In the embossing illustrated in FIG. 7B, a groove extending vertically is intermittently repeated in a circumferential direction at roughly equal intervals (Reference Example 2).

There also occurs a difference in rigidity in the embossing disclosed in the Reference Examples. Therefore, when rolling up the blank, an easy roll-up portion and a hard roll-up portion will possibly occur. On the other hand, because the embossing is provided at regular intervals, it is not said that the rigidity is nonuniform when viewing the blank in its entirety, and thus it is not said that the difference in rigidity is too much to the extent that the difference noticeably hinders formation of a curved surface. As a result, the possibility of occurrence of the bonding defect is not so high.

Preferred Embodiment

Figure 8:
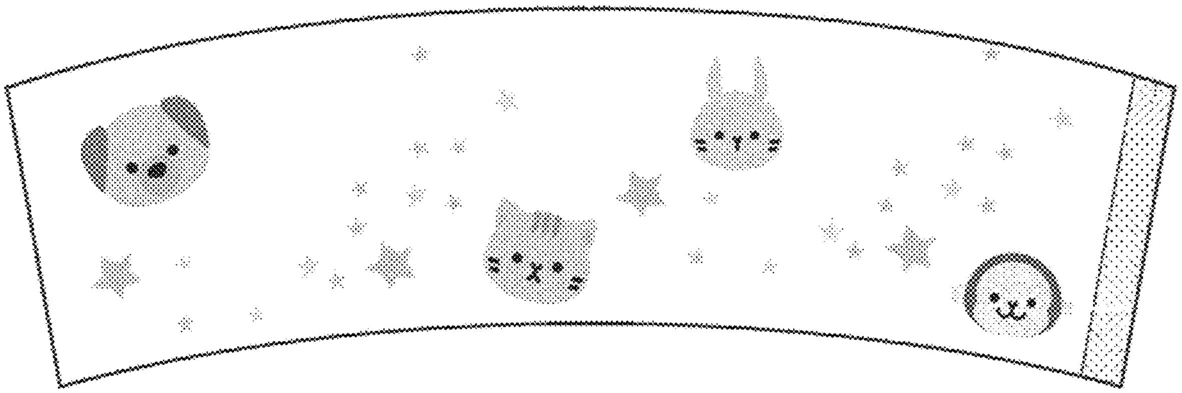
FIG. 8 illustrates a blank according to a Preferred Embodiment.

FIG. 8 illustrates a blank for a body section of a paper cup according to a preferred embodiment (Preferred Embodiment 1). In the blank of Preferred Embodiment 1, such a design is printed that animal character images are arranged irregularly in each of the roughly quar-sectioned areas, many stars having different sizes are irregularly (randomly) arranged between the animal character images, and embossing is provided corresponding to the printing.

Figure 9:
FIG. 9 illustrates a blank according to another Preferred Embodiment.

FIG. 9 illustrates another blank for the body section of the paper cup according to another preferred embodiment (Preferred Embodiment 2). In the blank of Preferred Embodiment 2, a center area of roughly tri-sectioned areas is provided with printing of logo characters with designs, and embossing is provided corresponding to the printing. The logo characters will be described in detail. Relatively large characters are written horizontally at about a center of a circular design. Relatively small characters are arranged on an upper side and a lower side of the relatively large characters at about the center in such a manner that the relatively small characters encircle the relatively large characters at about the center. The logo characters on the upper side are projected, and the logo characters on the lower side are recessed. Further, in both side areas of the roughly tri-sectioned areas, grooves extending in an up and down direction are intermittently repeatedly embossed in a circumferential direction at roughly equal intervals.

Although an illustration is omitted here, in a case of expressing a random design such as wood grain feeling by using a combination of printing and embossing, it is suitable to apply the invention of the present application to such design.

In the embossing according to the Preferred Embodiments, the rigidity is nonuniform, and thus, upon rolling up the blank, an easy roll-up portion and a hard roll-up portion appear irregularly. Because the embossing is irregularly provided and/or the embossing is remarkably biased to some areas, the embossing noticeably hinders formation of a curved surface. As a result, in comparison with the Reference Examples, there are more possibilities to invite a bonding defect. Further, it is hard to accurately predict a possible occurrence of the inconvenience in forming a curved surface at the designing step. Therefore, an effect produced by the formation of the folding line L (described below) becomes remarkable.

Still further, in the Preferred Embodiments, because the design is preliminary printed, it is necessary to make the embossing position correspond to the print position. It is hard to adjust a rolling position (bonding position) for the purpose of reducing a possible bonding defect. In this point, also, an effect produced by the formation of the folding line L (described below) becomes remarkable in the Preferred Embodiments.

Effect 1

Figure 10:
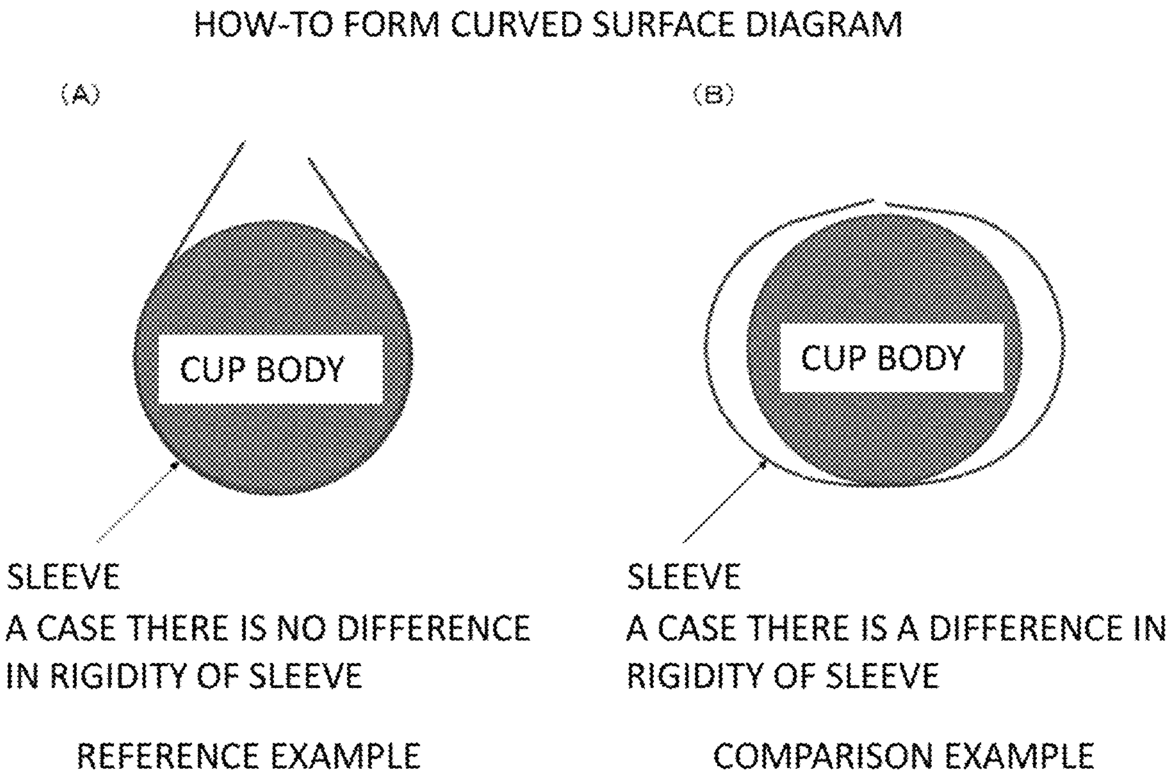
FIG. 10 illustrates a forming method according to the Reference Example and a forming method according to a Comparison Example.
Figure 11:
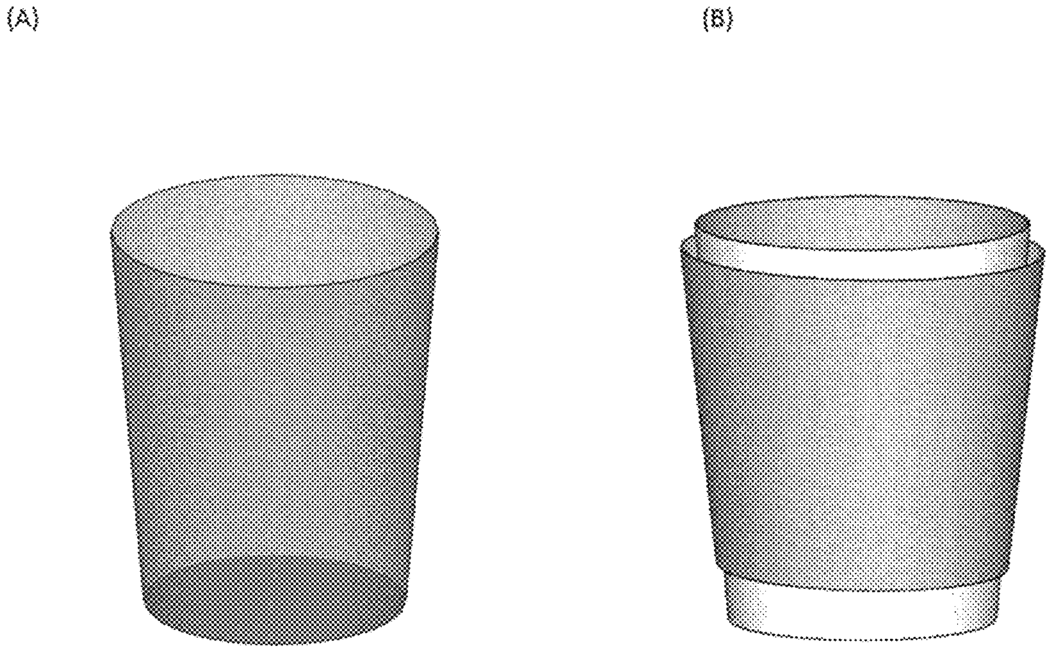
FIG. 11 illustrates examples of the paper containers.

An effect produced by the formation of the folding line L of the present application will be described below in comparison with a Comparison Example. Before explaining the Comparison Example, the Reference Examples (see, the above) will be described. FIG. 10A illustrates a forming method disclosed in the Reference Examples. In the Reference Examples, it is not said that the rigidity is nonuniform when viewing the blank in its entirety (considering that there is no difference in rigidity), and thus it is not said that the difference in rigidity is too much to the extent that the difference noticeably hinders formation of a curved surface. As a result, the possibility of occurrence of the bonding defect is not so high.

FIG. 10B illustrates a forming method disclosed in the Comparison Example. More specifically, FIG. 10B illustrates an example of an inconvenience when forming a curved surface in Preferred Embodiment 2.

In Preferred Embodiment 2, the rigidity is noticeably high at the center area of the tri-sectioned areas, and the rigidity in the circumferential direction of both right and left side areas of the roughly tri-sectioned areas is low in comparison with the rigidity of the center area of the tri-sectioned areas (e.g., less than 75%, more specifically, less than 50%).

As a result, when forming a curved surface, the blank becomes flat, and thus it becomes difficult to place the upper end part 2 of the blank above the lower end part 1 of the blank. This may invite a bonding defect.

To the contrary, even in a case where some inconveniences occur in forming a curved surface, the formation of the folding line L according to the present application enables facing of the bonding surfaces. This makes it easy to place the upper end part 2 of the blank above the lower end part 1 of the blank (see, FIG. 1). This can reduce a possible occurrence of the bonding defect.

Effect 2

In the above-described Preferred Embodiments, the design property is enhanced by the combination of printing and embossing. At the time, correspondence between the printing position and the embossing position is important. If there occurs a dislocation between the printing position and the embossing position, the design property is remarkably degraded.

To solve the above-described problem, the formation of the folding line L according to the present application is performed together with the embossing (see, FIG. 4). When forming the folding line L of the present application, the one end part 1 of the blank is locked by the creaser 10. As a result, a possible dislocation of the blank on the support table is eliminated, and thus the correspondence between the printing position and the embossing position is achieved. This clarifies the design.

Modification Example

The blanks disclosed in the Reference Examples and the Preferred Embodiments are to be subjected to embossing. A basis weight of the general blank is 150-350 $g/m^2$.

By the way, in a case of the basis weight beyond 200 $g/m^2$, more specifically, the basis weight beyond 250 $g/m^2$, the rigidity becomes remarkably high. Therefore, a problem alike the problem of the present application may arise disregarding whether the embossing is provided or not.

Also in a case where the blank has a high rigidity, an effect similar to the effect produced by the formation of the folding line L according to the present application can be obtained.

REFERENCE CHARACTER LIST

1 one end part of a blank (lower side)
2 other end part of a blank (upper side)
10 creaser
11 upper section of creaser
12 lower section of creaser
13 slope
L folding line

The invention claimed is:

1. A method for forming a body section of a paper cup, wherein the body section of the paper cup is formed from a blank, wherein the blank is formed into a reverse truncated cone shape or a cylindrical shape, wherein the blank is preliminarily provided with printing of a design, the method comprising:

a step of embossing on the blank so as to correspond to the printing;

a step of folding a one end part of the blank by an angle of 30-90 degrees with respect to a surface of the blank to form a folding line;

a step of rolling up the blank to form a curved surface; and a step of bonding the one end part of the blank to an other end part of the blank along a bonding width of an overlap region of the body section;

wherein a folding position of the folding line is away from an edge of the one end part of the blank by 30-100% with respect to the bonding width of the overlap region of the body section formed by the blank;

wherein the one end part of the blank is locked by a creaser during the step of folding;

wherein the step of folding is performed together with the step of embossing; and wherein the one end part of the blank is placed underneath the other end part of the blank, such that the other end part of the blank is placed above the one end part of the blank to form the overlap region.

2. The method for forming the body section of the paper cup according to claim 1, wherein the embossing provided on the blank in the step of embossing, comprising an arrangement of at least three embossing features, the features varying in size and shape and being spaced at different distances from each other, makes a nonuniform rigidity of the blank.

3. The method for forming the body section of the paper cup according to claim 1, wherein the embossing provided to a center area of the blank makes a nonuniform rigidity of the blank.

4. A method for forming a paper sleeve for a cup, wherein the paper sleeve is formed from a blank, wherein the blank is formed into a reverse truncated cone shape or a cylindrical shape, wherein the blank is preliminary provided with printing of a design, the method comprising:

a step embossing on the blank so as to correspond to the printing;

a step of folding a one end part of the blank by an angle of 30-90 degrees with respect to a surface of the blank to form a folding line;

a step of rolling up the blank to form a curved surface; and a step of bonding the one end part of the blank to an other end part of the blank along a bonding width of an overlap region of the paper sleeve;

wherein a folding position of the folding line is away from an edge of the one end part of the blank by 30-100% with respect to the bonding width of the overlap region of the paper sleeve formed by the blank;

wherein the one end part of the blank is locked by a creaser during the step of folding;

wherein the step of folding is performed together with the step of embossing; and wherein the one end part of the blank is placed underneath the other end part of the blank, such that the other end part of the blank is placed above the one end part of the blank to form the overlap region.

5. The method for forming the paper sleeve for the cup according to claim 4, wherein the embossing provided on the blank in the step of embossing, comprising an arrangement of at least three embossing features, the features varying in size and shape and being spaced at different distances from each other, makes a nonuniform rigidity of the blank.

6. The method for forming the paper sleeve for the cup according to claim 4, wherein the embossing provided to a center area of the blank makes a nonuniform rigidity of the blank.

* * * * *